(12) United States Patent
Schumacher

(10) Patent No.: US 6,898,479 B2
(45) Date of Patent: May 24, 2005

(54) METHOD AND DEVICE FOR THE FAILSAFE MONITORING OF THE ROTATIONAL MOVEMENT OF A SHAFT

(75) Inventor: Manfred Schumacher, Esslingen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/643,198

(22) Filed: Aug. 18, 2003

(65) Prior Publication Data
US 2004/0094045 A1 May 20, 2004

Related U.S. Application Data

(63) Continuation of application No. PCT/EP02/01747, filed on Feb. 19, 2002.

(30) Foreign Application Priority Data
Mar. 8, 2001 (DE) .......................... 101 12 230

(51) Int. Cl.$^7$ ........................... G06F 19/00; B21B 33/00
(52) U.S. Cl. .......................... 700/206; 700/90; 700/117; 377/2
(58) Field of Search ............................... 700/1, 90, 95, 700/117, 206; 377/1, 2

(56) References Cited

U.S. PATENT DOCUMENTS

| | | | | | |
|---|---|---|---|---|---|
| 4,517,684 A | * | 5/1985 | Fennel | ........................ | 377/19 |
| 4,521,894 A | * | 6/1985 | Moffat | ........................ | 377/16 |
| 5,931,008 A | | 8/1999 | Mizutani et al. | | |

FOREIGN PATENT DOCUMENTS

| | | |
|---|---|---|
| DE | 1 202 718 | 10/1965 |
| DE | 28 01 326 A1 | 7/1979 |
| DE | 39 25 889 A1 | 2/1990 |
| DE | 39 11 830 A1 | 10/1990 |
| EP | 0 090 717 | 10/1983 |
| JP | 6-122007 | * 5/1994 |

OTHER PUBLICATIONS

Sicherheitssteuerungen Systemfamilie PSS, PSS Standardfunktionsbausteine, MBS Exzenterpressen, Version 2.1, Bedienungsanleitung, Sach–Nr. 19 196; pp. 4–108–4–112.
Failsafe Function Blocks, SB 077/SB 078—Monitoring broken shearpins on eccentric presses; Pilz GmbH & Co., one (1) sheet.

* cited by examiner

Primary Examiner—Jayprakash N. Gandhi
(74) Attorney, Agent, or Firm—Harness, Dickey & Pierce, P.L.C.

(57) ABSTRACT

A method for the failsafe monitoring of the rotational movement of a shaft comprises a first step of picking up a characteristic pulse train with a number of pulses following one another at successive times, the time interval between the pulses is dependent on the rotational movement. A second step determines a monitoring time period and a third step monitors whether an expected pulse of the pulse train occurs within the monitoring time period. Finally, there is a fourth step of generating a control signal when the expected pulse does not occur within the monitoring time period. The mounting time period is repeatedly adapted to the time interval of the pulses during monitoring.

12 Claims, 2 Drawing Sheets

METHOD AND DEVICE FOR THE FAILSAFE MONITORING OF THE ROTATIONAL MOVEMENT OF A SHAFT

CROSS-REFERENCES TO RELATED APPLICATIONS

This application is a continuation of copending international patent application PCT/EP02/01747 filed on Feb. 19, 2002 designating the U.S., which PCT application is published in German language and claims priority from German patent application DE 101 12 230.6, filed on Mar. 8, 2001.

BACKGROUND OF THE INVENTION

The present invention generally relates to a method and device for the failsafe monitoring of the rotational movement of a shaft.

More specifically, the invention relates to a method for the failsafe monitoring of the rotational movement of a shaft, comprising the steps of:

generating a characteristic pulse train with a number of pulses following one another at successive times, the time interval of which is dependent on the rotational movement of the shaft, determining a monitoring time period, monitoring whether an expected pulse of the pulse train occurs within the monitoring time period, and generating a control signal if the expected pulse does not occur within the monitoring time period.

The invention further relates to a device for the failsafe monitoring of the rotational movement of a shaft, having a first part for picking up a characteristic pulse train with a number of pulses following one by another at successive times, the time interval of which is dependent on the rotational movement of the shaft, having a second part for determining a monitoring time period, having a third part for monitoring whether an expected pulse of the pulse train occurs within the monitoring time period, and having a fourth part for generating a control signal when the expected pulse does not occur within the monitoring time period.

Even more specifically, the invention relates to the failsafe monitoring of the connecting member between a rotational shaft of a press and a cam-operated switchgroup used for operational control of the press, which is sometimes called shear pin monitoring. However, the invention should not be restricted just to this specific application. On the other hand, it relates only to the failsafe monitoring of rotational movement. "Failsafe" means in this connection that the corresponding devices and equipment conform at least to category 3 of European Standard EN 954-1 or criteria generally recognized as being comparable.

The operation of a mechanical press is generally controlled by means of what is known as a cam-operated switchgroup. Such a switchgroup generates a number of successive pulses, the time interval of which is dependent on the rotational movement of the controlled or monitored shaft. The cam-operated switchgroup is connected to the shaft by a connecting member either directly via a transmission or indirectly via a chain or a toothed belt. In the case of a mechanical press, which is a source of considerable risk to the operating personnel during operation, the pulses of the cam-operated switchgroup must undergo failsafe monitoring to ensure that the press is operating properly. If the pulses do not occur, an immediate, failsafe shutdown of the press takes place, since otherwise an uncontrolled and consequently dangerous state exists.

The monitoring of the pulse train and the shutdown of the press take place with a failsafe monitoring device or a failsafe programmable controller in the aforementioned sense. This is because, on account of the safety-critical use, the devices have to meet especially high requirements in terms of their intrinsic failsafe nature. They are only authorized for safety-critical use by the responsible supervisory authorities, for example the employers' liability insurance associations, if conformity with the standards and criteria is completely verified.

For these reasons, previously known monitoring devices are of a relatively simple construction. They exclusively operate with selectable but predefined monitoring time periods. In the case of presses with a variable number of strokes, however, this leads to the problem that the monitoring time period must be set to the smallest number of strokes occurring and consequently to the slowest rotational movement of the shaft. Otherwise, small numbers of strokes give rise to false alarms, which lead to unnecessary and expensive downtimes. Greater numbers of strokes, however, produce relatively long reaction times when shutting down, which is disadvantageous in an emergency situation.

SUMMARY OF THE INVENTION

It is therefore an object of the present invention to improve a method and a device of the type stated at the beginning in order to achieve, with reasonable expenditure, still greater safety for the operating personnel involved.

According to one aspect of the invention, this and other objects are achieved by a method of the type stated at the beginning in which the monitoring time period is repeatedly adapted to the time interval of the pulses during the monitoring. According to another aspect, the object is achieved by a device in which the second part is configured to repeatedly adapt the monitoring time period to the time interval of the pulses during the monitoring.

In contrast to previously known monitoring devices, the monitoring of the pulse train now takes place for the first time in an adaptive manner with regard to the current operating parameters of the monitored machine. The time basis of the monitoring is respectively adapted to the current rotational speed of the shaft. As a consequence, the non-occurrence of an expected pulse is detected with the smallest delay time, irrespective of the current rotational speed of the shaft and consequently irrespective of a number of strokes of the press. The monitoring device can therefore react to a critical failure in a shorter time and shut down the monitored machine, such as for example a press. The shortened reaction times mean greater safety for the operating personnel involved.

In addition, the previously required manual setting of the monitoring time period on the monitoring device is no longer required. As a result, errors caused by human failure are avoided, which further increases the safety for the operating personnel involved. As a side effect, the installation expenditure or set-up expenditure before the press is put into operation is also reduced.

In a refinement of the invention, the monitoring time period is determined as a function of the time interval of two pulse edges.

As an alternative to this, it would also be possible to determine the monitoring time period as a function of an instantaneous frequency of the pulse train, for instance. The aforementioned measure can be realized more simply and with quicker in operation. This permits further minimization of the reaction times when shutting down a machine.

In a further refinement, the monitoring time period is determined as a function of directly successive pulse edges.

This measure permits especially rapid adaptation of the monitoring time period to any change of the rotational movement of the monitored shaft. Consequently, the reaction times of the monitoring device can be minimized still further.

In a further refinement, the monitoring time period is newly determined for each expected pulse.

On the basis of this measure, the monitoring time period is optimally adapted to the rotational movement of the monitored shaft in each case. As a consequence of this, false alarms are avoided very reliably in spite of smallest possible monitoring time periods.

In a further refinement, the occurrence of each pulse edge of the expected pulse is monitored during the monitoring step.

In this refinement of the invention, the system does not wait for the occurrence of a complete pulse, but instead already monitors the occurrence of each individual pulse edge of the pulse. The occurrence of a complete pulse is virtually doubled-checked. This permits a still more rapid reaction time and consequently contributes once again to an optimization of safety.

It goes without saying that the features mentioned above and still to be explained below can be used not only in the combination respectively indicated but also in other combinations or on their own without departing from the scope of the present invention.

BRIEF DESCRIPTION OF THE DRAWING

Exemplary embodiments of the invention are explained in more detail in the description which follows and are represented in the drawing, in which.

DETAILED DESCRIPTION OF PREFERRED EMBODIMENTS

Figure 1:
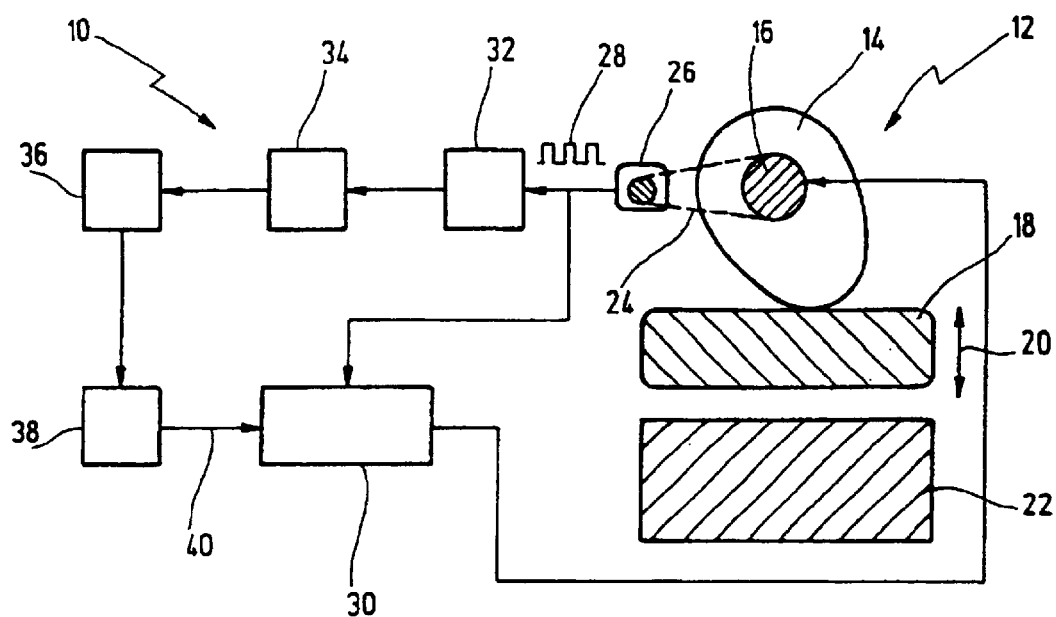
FIG. 1 shows a schematic representation of a device according to the invention for shear pin monitoring in the case of an eccentric press.

In FIG. 1, a device according to the invention is designated overall by reference numeral 10.

The device 10 serves for the failsafe monitoring of the operating sequence of an eccentric press 12, which is only schematically represented here by way of example. Other types of presses might also be envisaged. The press 12 has an eccentric 14, which is arranged on a shaft 16. By means of the shaft/eccentric combination, what is known as a tappet 18 is moved in the direction of an arrow 20. In its lowered position, the tappet 18 interacts with a generally fixed press bed 22, in order to bring a workpiece into a desired form. The construction of such a press is known per se and is therefore not presented any further here.

In the exemplary embodiment shown, shaft 16 of press 12 is connected to a cam-operated switchgroup 26 by means of a chain 24. As an alternative to chain 24, a toothed belt or a transmission could also be used. Such an arrangement and corresponding cam-operated switchgroups for controlling presses are likewise sufficiently known.

In dependence on the rotational movement of shaft 16, the cam-operated switchgroup 26 generates a pulse train 28, which is fed in a way known per se to a control unit 30 for controlling the press 12. The control unit 30 is, for example, a programmable logic controller.

The pulse train 28 is fed furthermore to the device 10 according to the invention, in order to permit the failsafe monitoring and emergency shutdown of press 12. In this respect it should be mentioned here that the pulse train 28 is only represented schematically. In practice, it may also comprise a number of different pulse trains, which are differently evaluated by device 10 and control unit 30.

The device 10 comprises a first part 32 for picking up the pulse train 28 generated by the cam-operated switchgroup 26. For example, it is the I/O card of a failsafe programmable logic controller, as sold by the applicant of the present invention.

The picked-up pulse train 28 is fed to a second part 34, which determine a monitoring time period in the way discussed below. With the aid of a third part 36, it is subsequently checked whether a next, expected pulse of the pulse train 28 occurs within the specific monitoring time period. If the expected pulse does not occur within the monitoring time period, a fourth part 38 generates a control signal 40, which, if appropriate, brings about a failsafe shutdown of the press 12.

According to a preferred exemplary embodiment of the invention, the second, third and fourth parts 34, 36, 38 are realized as software modules on a failsafe programmable logic controller, as sold by the applicant of the present invention under the trademark "PSS". The programmable controller may in this case also comprise the control unit 30. As an alternative, the parts 32–34 may, however, be implemented in a special, independent monitoring device for shear pin monitoring.

Figure 2:
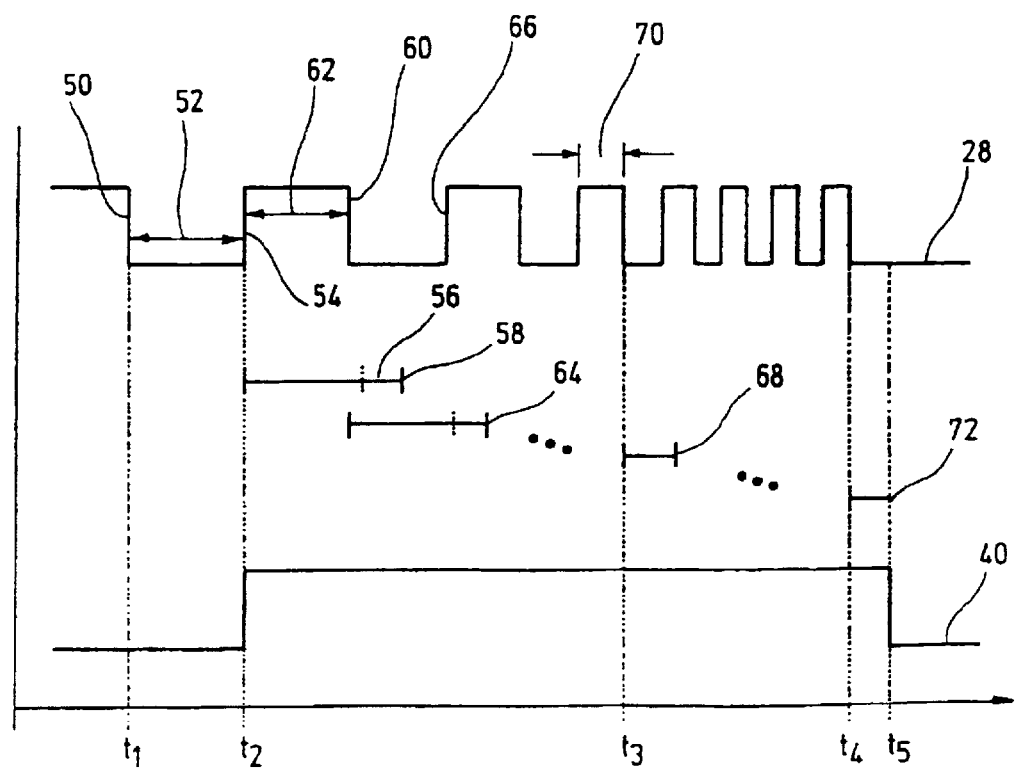
FIG. 2 shows a representation of the time relationships during the monitoring of the characteristic pulse train.

The mode of operation of the device 10 is evident from the following representation of the time relationships in FIG. 2. In this figure, same reference numerals designate the same elements as in FIG. 1.

In FIG. 2, the time relationship between the pulse train 28 and the control signal 40 is represented. At the moment in time $t_1$, the first part 32 detects a first pulse edge 50 of the pulse train 28. This pulse edge triggers a time measurement, which determines the time interval 52 up to the occurrence of the next pulse edge 54. The second part 34 subsequently determines a first monitoring time period 58 from the time interval 52 plus a tolerance time 56. The device 10 also detects with the second pulse edge 54 that a pulse train 28 exists. The control signal 40 is therefore switched on at the moment in time $t_2$. The press 12 can then be put into operation.

Figure 3:
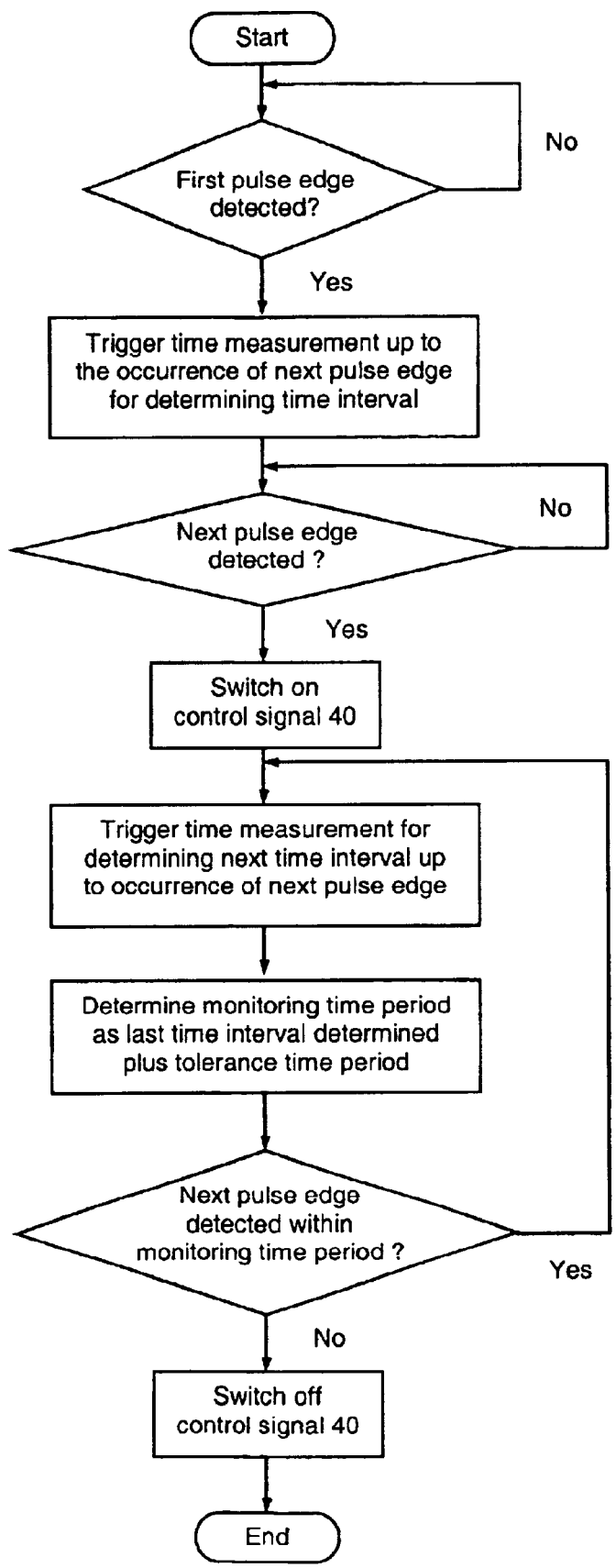
FIG. 3 is a flowchart diagram illustrating the method of operation of the device.

The third part 36 monitor whether a next (expected) pulse edge 60 occurs within the first monitoring time period 58. If this is the case, as represented in FIG. 3, the control signal 40 remains switched on and the press 12 can continue to be operated.

Furthermore, the second part 34 measure the time interval 62 between the pulse edges 54 and 60, and determines from this a second monitoring time period 64, within which the next expected pulse edge 66 must occur. The steps are continuously repeated as shown in the flowchart diagram of FIG. 3.

By way of example, at the moment in time $t_3$ the beginning of a further monitoring time period 68 is represented. The length of this monitoring time period 68 depends on the time interval 70 of the two preceding pulse edges. Since the monitoring time period is continuously adapted to the time interval of the two preceding pulse edges during monitoring, and consequently to the interval of the pulses, tile monitoring time period 68 is clearly shorter here than the monitoring time period 58. Such a time relationship arises for example when running up the press 12 to a maximum number of strokes or in the case of a press with a variable number of strokes.

At the moment in time $t_4$, a further monitoring time period 72 is started as a function of the preceding pulse length. As represented in FIG. 2, however, the next pulse edge, expected by moment in time $t_5$, does not occur. This has the consequence that the fourth means 38 switch off the control signal 40 in failsafe mode, which has the consequence of an immediate, likewise failsafe, shutdown of press 12. The non-occurrence of the expected pulse may be caused for example by the chain 24 being broken, causing the cam-operated switchgroup 26 to be separated from the shaft 16. In this case, which is referred to in technical terminology as a shear pin (or shaft) rupture, it is possible that the tappet 20 of the press 12 is still moved even though a standstill of the press is signaled to the controller 12. This dangerous state for an operator is ended with the smallest possible reaction time on account of the invention. In addition, however, a shutdown of the press 12 also takes place in all other cases, in which an expected pulse of the pulse train 28 does not occur within the respectively current monitoring time period.

What is claimed is:

1. A method of monitoring failsafe operation of a connecting member in a press having a shaft adapted for rotational movement and a cam-operated switchgroup connected to the shaft by means of the connecting member, said method comprising the steps of:

generating, by means of the cam-operated switchgroup, a pulse train comprising a number of successive pulses each separated one from another by an individual time interval, the individual time intervals between successive pulses being dependent on the rotational movement of the shaft, determining a monitoring time period within which an expected next pulse of the pulse train should occur, monitoring whether the expected next pulse actually occurs within the monitoring time period, and generating a control signal if the expected next pulse does not occur within the monitoring time period, wherein the monitoring time period is repeatedly adapted to the individual time intervals.

2. The method of claim 1, wherein the pulse train comprises a plurality of pulse edges and wherein the monitoring time period is determined as a function of the individual time intervals between two of the pulse edges.

3. The method of claim 2, wherein the monitoring time period is determined as a function of immediately successive pulse edges.

4. The method of claim 1, wherein the monitoring time period is newly determined for each expected next pulse.

5. The method of claim 1, wherein the expected next pulse comprises two pulse edges and wherein occurrence of each of these two pulse edges is monitored in the monitoring step.

6. In a press having a shaft adapted for rotational movement, a method of using a device for shear pin monitoring, said device having a first part for picking up a pulse train comprising a number of successive pulses which are separated one from another by individual time intervals dependent on the rotational movement of the shaft, having a second part for determining a monitoring time period, having a third part for monitoring whether an expected pulse of the pulse train occurs within the monitoring time period, and having a fourth part for generating a control signal when the expected pulse does not occur within the monitoring time period, the second part being configured to repeatedly adapt the monitoring time period to the individual time intervals.

7. A method for the failsafe monitoring of the rotational movement of a shaft, comprising the steps of:

generating a pulse train with a number of successive pulses separated by individual time intervals which are dependent on the rotational movement of the shaft, determining a monitoring time period within which an expected pulse should occur, monitoring whether the expected pulse occurs within the monitoring time period, and generating a control signal if the expected pulse does not occur within the monitoring time period, wherein the monitoring time period is repeatedly adapted to the rotational movement of the shaft during the monitoring.

8. The method of claim 7, wherein the pulse train comprises a plurality of pulse edges and wherein the monitoring time period is determined as a function of the individual time intervals between two of the pulse edges.

9. The method of claim 8, wherein the monitoring time period is determined as a function of directly successive pulse edges.

10. The method of claim 7, wherein the monitoring time period is determined for each expected pulse.

11. The method of claim 7, wherein the expected pulse comprises two pulse edges and wherein the occurrence of each pulse edge is constantly monitored.

12. A device for the failsafe monitoring of the rotational movement of a shaft, said device having a first part for picking up a characteristic pulse train with a number of successive pulses which are separated by individual time intervals that are dependent on the rotational movement of the shaft, having a second part for determining a monitoring time period, having a third part for monitoring whether an expected pulse in the pulse train occurs within the monitoring time period, and having a fourth part for generating a control signal when the expected pulse does not occur within the monitoring time period, wherein the second part is configured to repeatedly adapt the monitoring time period to the individual time intervals.

* * * * *